(12) United States Patent
Stewart

(10) Patent No.: US 7,111,374 B2
(45) Date of Patent: Sep. 26, 2006

(54) DOOR SEAL DRILLING AND PINNING

(76) Inventor: John Howard Stewart, 5613 W. Splender Valley Dr., Janesville, WI (US) 53545

(*) Notice: Subject to any disclaimer, the term of this patent is extended or adjusted under 35 U.S.C. 154(b) by 160 days.

(21) Appl. No.: 10/404,697

(22) Filed: Apr. 1, 2003

(65) Prior Publication Data
US 2003/0188425 A1 Oct. 9, 2003

Related U.S. Application Data

(60) Provisional application No. 60/370,799, filed on Apr. 5, 2002.

(51) Int. Cl.
*B23Q 17/00* (2006.01)
*B23P 21/00* (2006.01)

(52) U.S. Cl. .......... 29/407.1; 29/432; 29/525.01; 29/33 K; 29/33 S; 83/684; 264/154; 264/156; 49/506

(58) Field of Classification Search .......... 29/407.1, 29/525.01, 432, 33 K, 33 S, 235; 49/475.1, 49/483.1, 490.1, 492.1, 502, 506; 264/154, 264/156; 83/30, 684
See application file for complete search history.

(56) References Cited

U.S. PATENT DOCUMENTS

| | | | | |
|---|---|---|---|---|
| 1,705,454 A | * | 3/1929 | Griffiths | 49/475.1 |
| 1,862,285 A | * | 6/1932 | Terry et al. | 49/475.1 |
| 2,139,329 A | * | 12/1938 | Fessler | 49/492.1 |
| 2,177,591 A | * | 10/1939 | Churchill | 24/458 |
| 2,935,770 A | * | 5/1960 | Gagnier | 49/492.1 |
| 2,938,249 A | * | 5/1960 | Milne | 49/492.1 |
| 2,972,789 A | * | 2/1961 | Mathues | 49/492.1 |
| 3,309,817 A | * | 3/1967 | Fisher | 49/492.1 |
| 3,543,374 A | * | 12/1970 | McConnell | 29/564.2 |
| 3,583,054 A | * | 6/1971 | Hughes | 29/26 A |
| 3,737,972 A | * | 6/1973 | Smoot | 29/453 |
| 4,569,116 A | * | 2/1986 | Enterkin | 29/564.2 |
| 4,600,884 A | * | 7/1986 | Hara | 324/236 |

(Continued)

FOREIGN PATENT DOCUMENTS

JP 04282438 A * 10/1992

(Continued)

OTHER PUBLICATIONS

Accu Pin, Advanced Engineered Systems, Inc., Are you inserting pins in your weather stripping?, date unknown, 1 sheet.

(Continued)

*Primary Examiner*—Essama Omgba
(74) *Attorney, Agent, or Firm*—Wilhelm Law Service; Thomas D. Wilhelm; Eric J. Lalor

(57) ABSTRACT

Improved drilling and pinning machines and methods for processing elongate flexible e.g. rubber strips of seal material for forming seals about openings. The machines and methods form precisely positioned holes in the rubber strip, and insert pins in the holes. Opposing ends of the pins are ultimately received in cooperating holes in the opening, mounting the seal strip to the opening. Machines and methods of the invention temporarily fix a strip or portion of the seal material to a rigid component of the machine. While the seal material is fixedly held, first and second holes are formed in general alignment with the length of the strip, or a subsequent hole is formed wherein location of the subsequent hole is based on location of a previously-formed hole. The formed holes and/or inserted pins are automatically inspected. The inspection information is forwarded to, and used by, the machine controller.

40 Claims, 3 Drawing Sheets

U.S. PATENT DOCUMENTS

| | | | | |
|---|---|---|---|---|
| 4,614,012 | A | * | 9/1986 | Blum .................. 29/33 K |
| 4,653,166 | A | * | 3/1987 | Bright ................. 29/235 |
| 4,692,973 | A | * | 9/1987 | Blum .................. 29/33 K |
| 4,759,809 | A | * | 7/1988 | Matsuo et al. ............. 156/64 |
| 4,834,153 | A | * | 5/1989 | Stegherr ................ 144/3.1 |
| 5,276,953 | A | * | 1/1994 | Hatch .................. 29/564.1 |
| 5,277,571 | A | * | 1/1994 | Brining ................ 425/289 |
| 5,484,641 | A | * | 1/1996 | Rotter ................. 428/139 |
| 5,584,216 | A | * | 12/1996 | Sinjen ................. 83/62.1 |
| 5,746,569 | A | * | 5/1998 | Smith et al. ............ 414/790.4 |
| 5,857,953 | A | * | 1/1999 | Selle et al. .............. 493/225 |
| 6,119,324 | A | * | 9/2000 | Suess ................. 29/417 |
| 6,179,718 | B1 | * | 1/2001 | Morath et al. ............ 470/57 |
| 6,295,908 | B1 | * | 10/2001 | Holzhauser et al. ......... 83/76.9 |
| 6,357,101 | B1 | * | 3/2002 | Sarh et al. ............. 29/407.09 |

FOREIGN PATENT DOCUMENTS

JP           04282440 A  * 10/1992

OTHER PUBLICATIONS

Evolving Strategies for Flexible Part Feeding, Adept Technology, Inc., Apr. 4-6, 2000, 17sheets.

The Essential Guide to Digital Video Capture, Imagenation Corporation, date unknown, 18 sheets.

* cited by examiner

DOOR SEAL DRILLING AND PINNING

BACKGROUND

Various types of motor vehicles such as cars, trucks, boats, aircraft, and the like, have doors for entrance into, and egress from, the vehicle. Certain such doors have flexible rubber seals which extend around e.g. the outer perimeter of the door to form a seal between the door and the vehicle body when the door is closed. Such seals can be used on doors whose main purpose is personnel entrance or egress; or can be used on other doors such as for sealing a vehicle compartment such as a trunk of a car, or service compartment of a boat or aircraft.

In the alternative, the seal can be mounted to the vehicle body about the door opening so as to interface with the door when the door is closed. The balance of the description herein assumes the seal strip is mounted on the door. However, the description applies equally to having the seal strip mounted about the door opening.

This invention relates to machines which form holes in the strip of rubber door seal material which goes around the doors or door openings of such motor vehicles, and which machines place attachment pins in the holes so formed. Such pins can be inserted into the rubber strip by inserting one leg of the pin into the hole, and forcing the pin sideways along the length of the rubber strip while tilting the pin relative to the rubber strip in a rocking motion so as to stretch the material adjacent the hole and thereby elongate the hole while simultaneously force the second opposing leg of the pin into the so-stretched hole. The pin can be removed from the rubber strip using a generally reverse sequence of steps. The insertion process can, of course, be different where the pin structure is different.

It is known to use automated machines to process extruded rubber strips which are to be used for door seals for the automotive industry. These machines automatically drill holes in the rubber strips at specified distances from each other and insert plastic pins into the holes. The plastic pins are used for mounting the door seal to the vehicle door, at holes disposed about the door. When the correct number of holes and pins are in the rubber strip to constitute the length of a finished seal product, the rubber strip is cut to length, as needed, and the process is repeated to produce another seal product. Conventional such machines produce parts, e.g. finished seal product, in the following manner.

A generally continuous strip of the extruded rubber strip is incrementally fed into the machine using various drive mechanisms until the position, on the rubber strip, for a hole and corresponding pin is located at the drill/pin insertion station. A hole is then drilled into the rubber strip and a pin is inserted.

The rubber strip is again incrementally fed until the position for the next hole and pin is located at the drill/pin insertion station whereupon the next hole is drilled and a pin is inserted into that next hole. The rubber is incrementally fed, and holes drilled and pins inserted, until the programmed number of pins are in the rubber extrusion, whereupon the rubber extrusion is incrementally fed, optionally forming more holes and inserting more pins, until the correct overall length of the part is achieved at a cutoff device. The cutoff device is then actuated to cut the rubber extrusion, separating the completed part from the generally continuous strip of rubber. Throughout the drilling and pinning process, the drilling head is in a fixed location. The pinning head can move relative to the direction of advance of the rubber strip, by any distance required to retrieve a pin from a pin track, and to place the pin in the hole just drilled.

Completed parts are inspected by the machine operator for pin-to-pin dimension and pin-to-end cut dimension. Typical tolerance which can be held for pin-to-pin distance is 1.5 to 3 millimeters, and which can be held for pin-to-end cut distance is 3 to 5 millimeters. Over a period of time, the dimensions measured in the finished parts commonly drift away from the target dimensions. Such drifting of dimensions is usually caused by minor changes in the durometer of the rubber extrusion from batch to batch in combination with the dimensional instability, deformability of typical rubber, elastomer-type materials. Also, rubber is sometimes extruded from a number of extruders, or can be extruded from a plurality of dies, which can also cause differences in durometer and/or extrusion profiles, both of which can affect the actual magnitudes of distances of interest in the finished parts. The changes in durometer, or physical profile of the extrusion can cause the rubber to exhibit, for example, more or less elasticity, accompanied by a greater or lesser stress/strain ratio in the rubber extrusions, which manifests itself by the dimensions drifting away from the target dimensions.

As the dimensions drift, and are detected by the operator as a result of inspecting the finished product parts, the operator calculates a compensation factor which he or she then enters into the machine control. The machine control adds or subtracts the compensation factor, as appropriate, to the incremental feed distance instructions sent to the feeding device at each increment of feeding the rubber strip to the work station, in an attempt to bring the length dimensions in subsequent work pieces back closer to the target dimensions.

The operator continuously performs finished parts inspections and regularly enters compensating adjustments corresponding to the results of such inspections.

End users of the rubber extrusions with pins continually seek better quality seals, parts. The end user has an urgent need for tighter pin-to-pin tolerances and tighter pin-to-end cut tolerances, as well as in-process inspection to ensure proper pin insertion. Current tolerance targets are 1 mm or better pin-to-pin tolerance and 2 mm or better pin-to-end cut tolerance. Achieving tight tolerances, using conventional technology, has been limited by the dimensional instability of the rubber. For example, the rubber is readily stretched, compressed, flexed transversely, and the like, all of which contribute to difficulty in forming a hole precisely at a predetermined location along the length of the rubber strip.

Additionally, the rubber seal fabricator wants to reduce scrap and does not want the operator to have the capability to manually influence the quality of the finished extrusion door seal product.

The basic problem addressed by the invention is that the holes in the pinned rubber must match up with corresponding receptor holes formed in the e.g. metal door of the vehicle. While the locations of the holes in the door can readily be held to close tolerance because the metal is rigid, it is more difficult to hold close tolerances on formation of holes in the rubber strip, hole-to-hole, or hole-to-end cut, because the rubber strip is more flexible, and is otherwise more deformable. For example, if the rubber strip gets stretched or compressed or flexed as the rubber strip is being fed into the hole forming position, the position of the hole so made, or a subsequent hole, when the rubber strip is relaxed, can be displaced from its desired location by an undesirable distance. If the hole is thus unacceptably displaced from the desired location, the door seal may not fit properly on the door, and may compromise at least part of the desired sealing affect between the door and the doorway opening in the vehicle body.

Conventionally available seal material processing machines, running at commercial speeds, with typical operators, can produce seal products wherein variance between target hole-to-hole distance and actual hole-to-hole distance, averages about 1.5 mm to about 3 mm of the target distances between holes. Average variance from target, of hole-to-cut off end of the part, is about 3 mm to about 5 mm. The objective of the invention is to reduce the average variances from target distances. Any reduction in variance below the conventionally available variances is an improvement, and thus can be within the scope of the invention. Variance of no more than 1 mm, hole-to-hole, is highly desired. Variance of no more than 2 mm, preferably no more than 1 mm, hole-to-cut off end, is highly desired.

In the conventional machines described hereinabove, the drilling head and the pinning head are mounted on separate supports. The drilling head is generally stationary. The pinning head has sufficient mobility to pick up a pin from a pin feed tray, to move under the drilling head when the drilling head is retracted from a drilled hole, and to install the pin into the hole. Both the drilling and the pinning steps are accomplished while the strip of flexible seal material is stationary.

Still referring to conventional machines, the feed drive which advances the rubber strip is set to intermittently feed increments of the raw material rubber strip in specified feed drive distance increments. Namely, a specified length of the rubber strip is fed into the machine, and stopped. The drilling and pinning devices drill a hole and insert a pin. The rubber strip is then fed the next incremental distance between holes to be formed, and stopped, whereupon a second hole is drilled and pinned. When the desired number of holes and pins have been applied to a desired length of the work piece, the rubber strip is cut for length, creating a finished part, and a new drilling and pinning sequence is started, to create a second seal product. In the alternative, additional holes can be drilled, and pins inserted, in a trailing length of the rubber strip while the first length concurrently advances, as part of the work piece still being drilled and pinned, to a downstream cut-off device.

Yet referring to conventional operations, selected ones of the finished parts are inspected by an operator for distances between respective holes in the work piece and for distances from the end pins to the ends of the work piece. The operator then adjusts the setting on the drive apparatus which drives feeding of the rubber strip through the machine, in accord with the findings of one or more such inspections. Meantime, while the operator is taking the measurements and determining desired adjustments, several more finished parts can have been produced at the existing drive distance setting. To the extent there was a drive distance error in the part which was inspected, the several more finished parts may have similar errors, and further, the magnitude of the error may have changed before the operator has made any adjustment.

So the operator's adjustment in conventional operations, while potentially precise with respect to the finished part measured, while potentially helpful in retaining the produced parts within the outer limits of a specified tolerance, lacks some desired element of precision as far as returning the hole-to-hole distance, or the hole-to-end distance, to the desired target magnitude. The operator thus continues to adjust the drive belt drive setting according to hindsight inspection of the finished parts coming off the machine. And only a small fraction of the finished parts can be inspected by hand. The end result is that a skilled worker can manage to hold tolerance of hole-to-hole distances to only about 1.5 mm to about 3 mm of the specified target distances.

Accordingly, it is an object of the invention to provide a door seal processing machine for receiving a generally continuous, or defined length, strip of seal material and fabricating door seal products therefrom, the machine including a track which mounts hole forming and pinning apparatus to a machine frame, a sensor sensing holes in the seal material, and a controller receiving the sensor output and using such output to compute and issue drive commands to a driver driving the hole forming and pinning apparatus along the track to a desired hole forming location.

It is a further object to provide such machine wherein the controller is programmed with instructions instructing movement of the hole forming and pinning apparatus back and forth along the track to form holes, and insert pins in the holes, optionally between a hole forming section of a work station, and a pinning section of the work station.

It is yet another object to provide a such machine including a detector detecting the location of the forming and pinning apparatus along the track, and sending such detect information to the controller which uses such location information in determining subsequent movement instructions for movement of the hole forming and pinning apparatus along the track.

It is still another object to provide a such machine wherein the controller uses the hole position information, as sensed by the sensor for one hole, both to instruct positioning of the hole forming and pinning apparatus for forming and pinning a hole, and to instruct a work piece driver regarding the incremental feed drive movement required to feed the desired length of door seal material to the work station at a given incremental feed event.

It is a still further object to provide, as the sensor, a visual image camera.

Still another object is to provide, as the sensor, a visual image camera, and optionally to further provide, in the camera memory or the controller memory, reference images which are representative of the work piece image profile desired, and to compare a reference image to an image captured by the camera.

Yet another object is to provide a method of processing door seal material including, while maintaining the door seal material in a longitudinally fixed location, moving the hole forming apparatus along the length of the seal material to a location, displaced from a hole being sensed, and forming a subsequent hole.

It is a still further object to provide a method using the sensed position of a first hole as basis for longitudinally positioning the hole forming apparatus and forming the next hole.

A still further object is to provide a machine and method of forming holes at a first location along a path of travel of the seal material and inserting pins at a second location, displaced from the first location, along the path of travel of the seal material, and optionally moving the hole forming and pinning apparatus back and forth between the forming and pinning locations.

Yet another object is to provide a method of forming holes in a strip of flexible door seal material, including sensing a hole, determining a location for forming a subsequent hole based on the location of the sensed hole, and moving movable hole forming apparatus, as necessary, along the length of the flexible strip, all while maintaining the strip of flexible door seal material in longitudinally-fixed locations.

Still another object is to provide a such machine and method of forming holes wherein the rubber strip is temporarily fixedly mounted in a fixture which moves along a fixture track, relative to the hole forming and pinning apparatus, and wherein a movement detector detects distance of movement of the fixture along the fixture track, or a sensor senses position of a sensed element of the fixture or work piece, along the track, and communicates such distances and locations to the controller, whereby the strip does not move relative to the fixture after a pin has been inserted and before the next hole is drilled.

Yet another object is to provide such machine and method wherein a length of the continuous-length flexible work piece material, corresponding to the length of a finished unit of product, is fed onto the work station, and clamped in the fixture, and the drilling and pinning head, preferably with commonly-mounted camera, is moved along the work piece length and caused to form holes, and insert pins into the holes along the full length of the work piece without unclamping the work piece from the fixture.

It is an object to provide such machine and method wherein a first/leading hole in the work piece is located based on the sensed relative position of an already-formed hole in a previously formed work piece.

SUMMARY

This invention is directed toward improved machines and methods for processing rubber and like strips of elongate door seal material for sealing about doors, trunks and the like of automobiles and other vehicles. More specifically, the invention provides improved machines and methods for forming and inspecting holes in the rubber strip material at predetermined locations, and inserting pins in the holes so made, and inspecting the inserted pins, and wherein the pins are received in cooperating holes in the vehicle door, for mounting the seal strip to the vehicle door. In preferred embodiments, machines and methods of the invention hold the seal strip motionless while the location of a previously formed hole is sensed, and a subsequent hole is formed. The hole sensing sensor preferably also senses information relating to various quality control checks relating to hole formation and/or pin insertion and forwards the sensed quality-related information to the machine controller, which is typically a programable logic controller (PLC) or other suitably programmable device.

In a first family of embodiments, the invention comprehends a door seal processing machine for receiving a strip of flexible door seal material and fabricating individual door seal products therefrom. The door seal processing machine comprises a frame; a work station supported on the frame; feed apparatus for feeding lengths of flexible door seal material to the work station; an electronic computer controller controlling operation of the door seal processing machine; and forming and pinning apparatus for forming holes in the flexible door seal material, and for inserting pins in the holes. A track mounts the forming and pinning apparatus to the frame at the work station, for movement of the forming and pinning apparatus along a path of travel generally parallel to the path of travel of the flexible door seal material at the work station. A sensor senses holes in the flexible door seal material and/or pins in the holes, and sends such sensed information to the electronic computer controller.

In some embodiments, the electronic computer controller is programmed with instructions instructing movement of the forming and pinning apparatus back and forth along the track between a hole forming section of the work station and a pinning section of the work station.

Preferred embodiments include a detector, such as an encoder, detecting location of the forming and pinning apparatus along the track, and sending detect information to the electronic computer controller. Programming in the electronic computer controller comprises data representing a desired sequence of distances between holes in such flexible door seal material, and an algorithm effective to calculate a distance of movement of the forming and pinning apparatus along the track, based on the information received from the detector, for subsequently forming a hole in such flexible door seal material.

In preferred embodiments, the feed apparatus intermittently feeds incremental lengths of the flexible door seal material to the work station, the electronic computer controller receives the sensed information regarding locations of one or more holes already formed, and is effective to control and adjust incremental feed drive movement required to feed desired lengths of the flexible door seal material to the work station, and distance of movement of the forming and pinning apparatus from a starting location to a hole forming location, both based on the sensed information, regarding location of an existing hole, received from the sensor.

Preferably, the sensor comprises a visual image camera, with the electronic computer controller optionally receiving the sensed information from the visual image camera and processing the sensed information in digital format.

Typically, the camera has an image window, and comprises an array of pixels which generate a representation of material in the image window on a graduated gray scale.

In some embodiments of the invention, one or both of the electronic computer controller and the camera is programmed with reference image data representing a hole meeting first predetermined specifications, and is further programmed to compare a visual image of a hole from the camera against the reference image and to make an accept/reject decision based on that comparison.

In some embodiments of the invention, in addition to or as an alternative of hole inspection, one or both of the controller and the camera is programmed with reference image data representing a pin meeting second predetermined specifications, and is further programmed to compare a visual image of a pin, received from the camera, against the reference image and to make an accept/reject decision based on the comparison.

In some embodiments, a strip-holding fixture is mounted for movement generally along the path of travel of the flexible seal material, parallel to any movement of the forming and pinning apparatus. The seal material is temporarily fixedly held in the strip-holding fixture after a hole has been sensed and until the next subsequent hole has been drilled. Movement of the strip relative to the forming and pinning apparatus can comprise movement of the fixture and strip, movement of the forming and pinning apparatus, or both.

In a second family of embodiments, the invention comprehends a door seal processing machine, comprising feed apparatus for feeding lengths of flexible door seal material along a path of travel to a work station; hole forming apparatus at a hole forming section of the work station, for forming holes in the flexible door seal material; and pinning apparatus at a pinning section of the work station, displaced from the hole forming section, for inserting mounting pins in the holes which are formed at the hole forming section. The pinning section is preferably displaced from the hole forming section by a distance approximating a predetermined desired distance between sequential holes in the seal strip.

In a third family of embodiments, the invention comprehends a door seal processing machine, comprising feed apparatus for feeding lengths of flexible door seal material into the machine; a work station comprising a guide bed receiving the flexible door seal material and guiding the flexible door seal material along a path of travel between a feed end of the work station and an exit end of the work station. An air chamber is positioned below the guide bed and is adapted to expel air upwardly through holes between the guide bed and the air chamber, thereby to facilitate movement of the flexible door seal material along the path of travel, on the guide bed. The machine further comprises forming and pinning apparatus adjacent the work station, adapted to form holes in the flexible door seal material, and to insert pins into holes so formed.

In a fourth family of embodiments, the invention comprehends a method of processing door seal material, in a door seal processing machine. The method comprises feeding a length of a strip of flexible door seal material onto a fixture at a work station; making a first hole in the flexible door seal material using hole forming apparatus; and while maintaining the door seal material in a longitudinally fixed location with respect to the fixture, sensing the location of the first hole in the flexible door seal material; and moving one or both of the hole forming apparatus and the fixture along the direction of the length of the flexible door seal material to a location such that the hole forming apparatus is displaced from the first hole, and is properly positioned for making a subsequent hole wherein the subsequent hole is to be displaced from the first hole by a specified distance, and forming the second hole.

In preferred embodiments, the method includes forming the first hole at a first location along a length of the door seal processing machine, and moving the hole forming apparatus along the length of the door seal processing machine to a second location along the length of the door seal processing machine, displaced from the first location, forming the second hole at a second location along the length of the door seal processing machine, the second location of the hole forming apparatus being displaced from the first location of the hole forming apparatus by the distance between the first and second holes, and forming a subsequent hole.

Also in preferred embodiments, the invention comprehends forming a plurality of holes in the flexible door seal material, the holes being displaced from each other along the length of the flexible door seal material, and inserting pins into the respective holes, including forming the holes at a first location along a path of travel of the flexible door seal material and inserting the pins at a second location along the path of travel of the flexible door seal material, the second location being displaced from the first location.

In other embodiments, the method includes forming the first hole at a first location along a length of the door seal processing machine, and moving the fixture, while fixedly holding the door seal material therein, along the length of the door seal processing machine, to a second location along the length of the door seal processing machine, relative to the hole forming apparatus, by the distance between the first and second holes being formed, and forming a subsequent hole without the door seal material moving relative to the fixture.

The method further can comprise moving both the fixture and the hole forming apparatus thereby to bring the location for the second hole into alignment with the hole forming apparatus.

The method optionally includes using a sensor to sense positions of the respective holes, and using the sensed position information to position the hole forming apparatus and/or the fixture, for forming holes trailing the respective sensed holes in the work piece flexible strip.

In some embodiments, the method includes using a sensor to sense longitudinal position of each hole, in sequence, and using the sensed longitudinal position information to longitudinally position the hole forming apparatus and/or the fixture for forming the next trailing hole in the flexible door seal material.

The method can include forming a plurality of holes spaced along the length of the door seal material strip, including using hole forming and pinning apparatus to form the holes, and to insert pins into the holes, including forming the holes generally at a first location along the path of travel of the door seal material through the door seal processing machine, and inserting the pins into the holes generally at a second separate and distinct portion of the path of travel of the door seal material.

In some embodiments, the method includes moving the hole forming and pinning apparatus back and forth between first and second locations along the path of travel of the door seal material, and alternating forming holes and inserting pins at the respective first and second locations.

The method preferably includes using, as the sensor, a vision image camera having an image window, the vision camera being preferably fixed in position at or adjacent the second location to sense location of the holes formed in the seal material strip, sending the sensed information to a computer controller, and using the computer controller to automatically make quality accept/reject decisions, and/or to instruct drive apparatus driving the hole forming and pinning apparatus to thereby position the hole forming and pinning apparatus for forming the next hole.

In some embodiments the method includes, for each hole and pin combination, forming the hole, indexing the flexible door seal material forward until the formed hole is within the image window of the fixed-position camera while also moving the hole forming and pinning apparatus along the path of travel of the flexible door seal material to a position adjacent the camera, and subsequently, while maintaining the door seal material in the longitudinally-fixed location, using the camera to sense the position and quality of the hole, sending the hole position and quality information to a computer controller, using the computer controller to make an accept/reject decision on the hole already formed and sensed, and to compute a distance to move the hole forming and pinning apparatus to a forming location for forming a subsequent hole, using the hole forming and pinning apparatus adjacent the camera to insert a pin in the formed hole, inspecting the inserted pin for one or more quality characteristics, and subsequently moving the hole forming and pinning apparatus the computed distance to the hole forming location and forming a subsequent hole in the flexible door seal material.

In preferred embodiments, adjacent ones of a population of the holes in the seal material are displaced from each other by an average variance of no more than about 1 mm from the specified target distance.

In a fifth family of embodiments, the invention comprehends a method of fabricating door seals in a door seal processing machine. The method comprises intermittently feeding lengths of the door seal material to a work station; forming a plurality of holes in the door seal material, and placing pins in the holes. While maintaining the door seal material in longitudinally fixed locations, a sensor senses locations of already-formed holes in the door seal material, uses respective ones of the sensed hole locations to determine locations for subsequently forming holes in the flexible door seal material, and locates movable hole forming apparatus, as necessary, along the length of the door seal material according to the locations determined from the sensed hole locations, thereby to properly locate the hole forming apparatus along the length of the door seal material displaced from the already-formed holes, for forming subsequent ones of the plurality of holes in the door seal material.

In preferred such embodiments, the method includes forming the subsequent holes in the flexible door seal material at the so-determined locations of the hole forming apparatus while maintaining the door seal material in a longitudinally fixed location between the time of sensing of a given hole and the time of forming of the respective subsequent hole.

The method preferably includes forming each hole in the flexible door seal material at the so-determined locations of the hole forming apparatus while maintaining the door seal material in a longitudinally fixed location between the time of sensing of a given hole and the time of forming of the subsequent hole.

In a sixth family of embodiments, the invention comprehends a method of fabricating door seals from a strip of door seal material. The method comprises intermittently feeding lengths of the door seal material along a path of travel to a work station; forming holes for mounting pins at a hole forming section of the work station; and inserting mounting pins in the formed holes at a pinning section of the work station displaced from the hole forming section of the work station.

Preferably, the pinning section is displaced from the hole forming section by a distance approximating a distance between sequential holes in the seal strip.

In a seventh family of embodiments, the invention comprehends a method comprising forming a first hole in the door seal material with hole forming apparatus; sensing location of the first hole along a length of the strip of door seal material; and using the sensed position of the first hole as basis for longitudinally positioning the hole forming apparatus and forming a subsequent hole in the strip at a desired distance from the first hole.

In yet an eighth family of embodiments, the invention comprehends a method comprising receiving the flexible door seal material at a work station comprising a guide bed, and guiding the flexible door seal material along a path of travel between a feed end of the work station and an exit end of the work station, and expelling air upwardly through the guide bed and thereby facilitating movement of the flexible door seal material along the path of travel, on the guide bed; and using forming and pinning apparatus adjacent the work station, forming holes in the flexible door seal material, and inserting pins in the holes so formed.

In a ninth family of embodiments, the invention comprehends a door seal processing machine and method for use. The door seal processing machine comprises a work station where work is performed on the door seal material; a fixture for gripping a length of the door seal material and, while gripped, moving the door seal material along a path of travel between a feed end of the machine and an exit end of the machine. The fixture grips and holds a length of the door seal material which extends between and beyond adjacent locations along the length of the door seal material where holes are to be formed and pins inserted. The fixture moves the door seal material from a first location to a second location while so holding the gripped length of door seal material. In the first location, a hole is formed in the door seal material, and a pin inserted into the hole. Position and quality of the hole, as quality of pin insertion, are sensed by a sensor. The sensed location of the hole and/or pin is used as basis for instructing the fixture the distance the fixture and seal material are to move to reach the second location.

Sensed quality characteristics of the hole and/or pin insertion can be used to automatically make accept/reject decisions.

Figure 1:
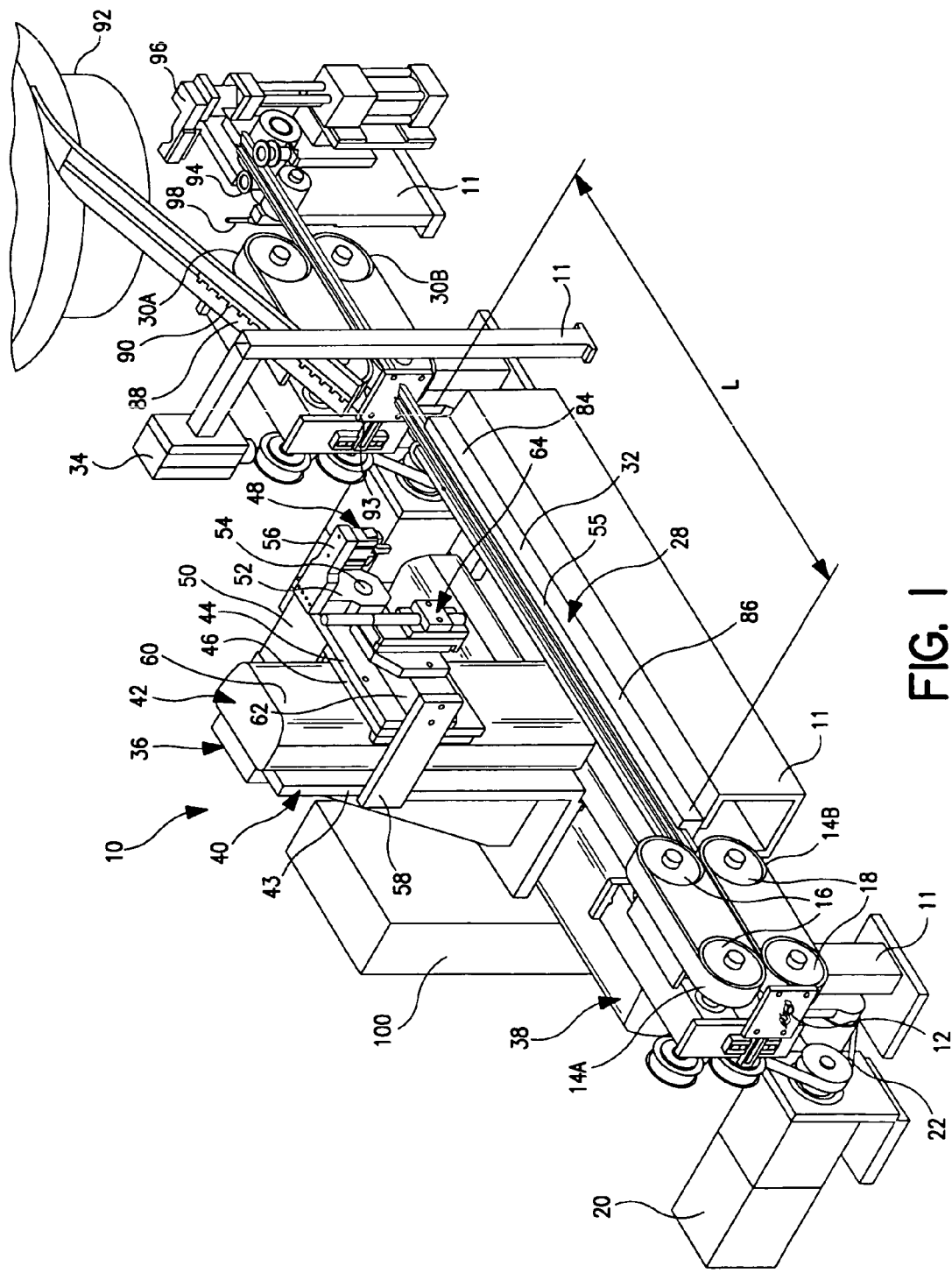
FIG. 1 shows a representative pictorial view of a hole forming and pinning machine of the invention.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Figure 2:
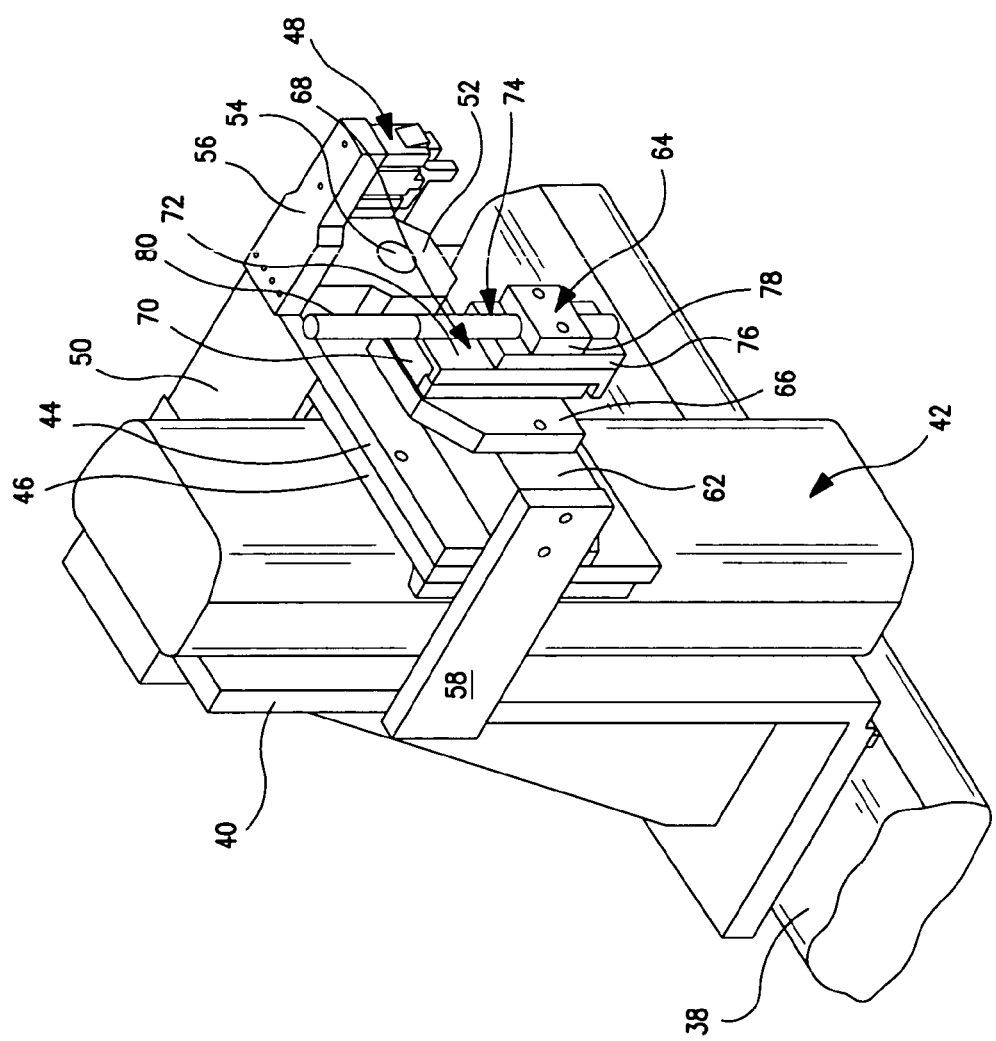
FIG. 2 shows a representative enlarged fragmentary portion of the machine of FIG. 1, in pictorial view.

Referring to FIGS. 1–2, an exemplary machine 10 of the invention forms holes and inserts pins in strips of flexible e.g. rubber door seal material. Machine 10 has a plurality of frame elements collectively designated 11 and generally supporting the various working elements of the machine from the floor or other underlying support. The overall operation of machine 10 is controlled by a controller 100, which is typically a programmable logic controller (PLC), or any other type of programmable device, for example and without limitation a personal computer.

Starting at the left end of the machine as viewed in FIG. 1, a generally continuous strip of rubber seal material 12 is fed from a supply (not shown) through a pair of feed belts 14A, 14B, which are driven by respective two sets of drawing rolls 16, 18, which are powered by a servo motor 20 through transfer belt 22.

Figure 4:
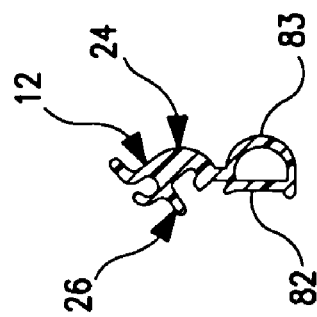
FIG. 4 shows a representative cross-section of the strip of rubber door seal material of FIG. 3.
Figure 5:
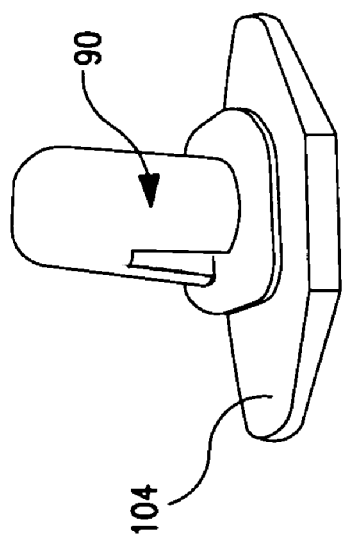
FIG. 5 is an enlarged pictorial view of a pin as shown in the rubber door seal material of FIG. 3.
Figure 3:
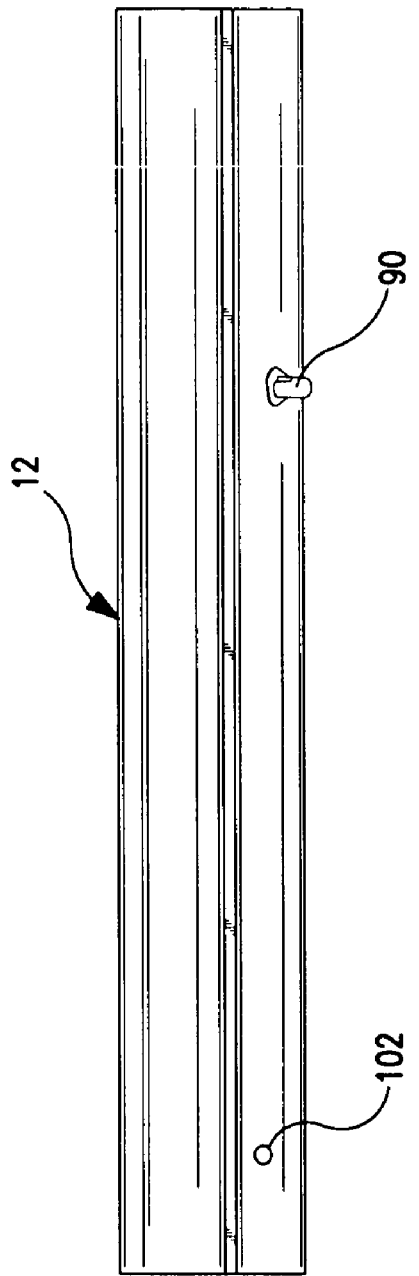
FIG. 3 shows a representative top view of a strip of rubber door seal material showing one hole, and a pin in a second hole spaced from the first hole.

An exemplary strip of rubber seal material 12 is shown in top view in FIG. 3. A cross-section of the exemplary rubber seal material is shown in FIG. 4. As seen in FIGS. 3 and 4, the strip of rubber seal material 12 can have a complex profile, complex both on a bottom surface 24 and on a top surface 26.

From the feed belts 14A, 14B, the rubber strip is fed onto a work station 28. Work station 28 extends generally from feed belts 14A, 14B at a feed end of the work station to a corresponding set of feed belts 30A, 30B at a distal exit end of the work station, also driven by e.g. a servo drive unit corresponding to motor 20 and transfer belt 22. Feed belts 14A, 14B, 30A, 30B can, in the alternative, be mechanically driven, such as by timing belts or drive shafts.

Work station 28 includes a guide bed 32 having a top surface profile corresponding generally to the profile of bottom surface 24 of the rubber strip. Thus, the bottom surface of the rubber strip fits into, and is readily guided along, the top surface of the guide bed.

A visual image camera 34 is located adjacent the distal end of the work station and is aimed at the guide bed, and thus at the strip of rubber seal material which is fed along the guide bed.

A hole forming and pinning assembly 36 is mounted to a longitudinally extending slide bed 38 which extends in the machine direction of machine 10 alongside work station 28. Slide bed 38 is mounted to one or more underlying elements of frame 11. The hole forming and pinning assembly is mounted to slide bed 38 by an L-shaped bracket 40 which slides longitudinally along the length "L" of the work station.

The hole forming and pinning assembly 36 has an upright slide bed 42 fixedly mounted to upright member 43 of L-shaped bracket 40.

Horizontal slide bed 38 and upright slide bed 42 are commercially available slide tables wherein a longitudinally extending drive screw, threaded essentially from end to end of the respective slide table, carries a table or carriage which moves longitudinally along the length of the slide table as the screw is turned. A conventional servo motor (not shown) is coupled to the drive screw for driving the table or bracket, and appurtenances attached thereto, along the length of the respective slide table.

Pinning head support brackets 44 and 46 are mounted to the table or carriage of upright slide bed 42 for powered up and down sliding movement of brackets 44 and 46 with respect to slide bed 42. Bracket 44 extends to and supports a pinning head 48 having well known structure. Bracket 46 extends to and supports a servo drive unit 50 which powers movement of the pinning head. Brackets 44 and 46 are fixedly joined to each other so as to move in unison up and down with respect to upright slide bed 42.

Pinning head 48 includes a support block 52 mounted on the output shaft 54 of servo drive unit 50, for rotational movement of the support block with output shaft 54 and with respect to bracket 44. A pinning assembly 56 is mounted to support block 52 and moves with support block 52, up and down along vertical slide 42, and in a back and forth rocking motion as shaft 54 rocks back and forth about its longitudinal axis.

Drill head support bracket 58 is fixedly mounted to L-shaped bracket 40 such as by welds, and extends from a side surface of the L-shaped bracket forward of a front surface 60 of vertical slide 42 and forward of pinning head support brackets 44, 46. Support bar 62 extends across and in front of brackets 44 and 46, and fixedly supports drill head assembly 64 from bracket 58.

Drill head assembly 64 (FIG. 2) includes a fixed mounting block 66 fixedly mounted to support bar 62 and a slide table 68 fixedly mounted to mounting block 66. Slide table 68 includes a fixed slide block 70, fixed in position with respect to mounting block 66, and a movable slide block 72 mounted for sliding engagement with fixed slide block 70. Movement of movable slide block 72 with respect to fixed slide block 70 is effected by a conventional slide table drive (not shown). A suitable such slide table is available from SCM Company, Indianapolis, Ind., as model number MX58-50A-X11.

A power drill unit 74 is mounted by mounting blocks 76, 78 to slide table 68 for up and down movement of the power drill with respect to work station 28 and any strip of flexible seal material on guide bed 32. Drill unit 74 includes a power head 80, which receives a well known hollow drill bit (not shown) in coupling relationship to the power head at the lower end of the drill unit.

The pin-holding tip of pinning assembly 56, and the drill bit in power head 80, are both aligned with, and are mounted and directed to intersect, a centerline which extends longitudinally along rubber strip 12 and through successive ones of holes 102.

As illustrated in FIG. 4, the rubber strip has two layers 82, 83 of rubber which could potentially be drilled by the drill bit. By turning the drill at a high speed of e.g. up to about 80,000 rpm, and by maintaining a sharp cutting edge on the drill bit, the process of the invention can drill through the top layer 82 of rubber without touching the underlying layer 83.

Namely, power head 80 drives the drill bit at a speed of up to about 80,000 rpm, in contact with the upper layer 82 of rubber in the rubber strip, drilling through upper layer 82, but not through the lower layer 83. As the drill bit drills the upper layer of rubber, a circular opening is cut about an encompassed puck which is being cut out of the rubber material. According to well known practice, once the puck is completely severed from upper layer 82, the puck moves upwardly inside the drill bit, and is expelled from the drill bit by centrifugal force, through a hole in the side of the drill bit.

Horizontal slide bed 38 includes a servo motor, with encoder, powering movement of hole forming and pinning assembly 36 along the slide bed on L-shaped bracket 40, with the slide bed serving as a slide track for sliding the hole forming and pinning assembly back and forth between a pinning section 84 of work station 28 and a hole forming section 86 of the work station. Accordingly, the servo motor drives the hole forming and pinning apparatus back and forth along the length of the horizontal slide bed, in the machine direction, as desired, for forming holes at hole forming section 86 and installing pins 90 in the holes at pinning section 84. Thus, the directions of movement of hole forming and pinning assembly 36 generally parallel the path of movement of the strip of flexible door seal material 12, along guide bed 32 and through machine 10.

In general, new holes are formed in the rubber strip in hole forming section 86 of the work station and pins are inserted in the newly-formed holes in pinning section 84 of the work station. In some instances, as at start-up described hereinafter, a hole is formed at pinning section 84.

In the embodiments illustrated in the drawings, visual image camera 34 is mounted to a supporting machine frame member 11, or is supported from the floor, adjacent the pinning section of the work station, at a generally fixed location.

As used herein, reference to a "generally fixed" location where camera images are collected means that the image collection element such as camera 34 is fixedly mounted to a generally immovable physical support such as an element of frame 11, and is directed to a specific step or steps at a specific work station in the manufacturing operation. Thus, "generally fixed" refers to a camera fixed in location, with optional capability to move the camera vertically up or down, or to digitally or optically zoom the image to facilitate inspection of certain elements of the work piece or work pieces, while not physically moving the "X–Y" location, or orientation, of the camera.

The known fixed location of the camera, and direction of orientation or aim of the camera, are calibrated and stored in memory, either at the camera or at a machine controller described hereinafter. The camera can, of course, be moved and its disposition subsequently recalibrated. In some embodiments, the camera is mounted on a moving fixture such as on slide bed 38, wherein an associated encoder senses the relative position of the camera as well as other operative elements mounted on slide bed 38, and reports same to PLC 100. PLC 100 can be calibrated with a specified home location, from which all other locations are defined, whereby the camera is calibrated to the PLC, while also being readily movable along the slide bed 38.

A pin feeder track 88 such as e.g. a slot track, is mounted adjacent the distal exit end of work station 28 and feeds pins 90 along a slot from a pin bin 92 to a pick-up station 93 where pinning head 48 picks up pins for insertion into holes in rubber strip 12. While track 88 is shown as an inclined straight track, the track can take on a variety of orientations and configurations, such as straight, curved, inclined, horizontal, upright, and the like; and any variety of suitable mechanisms can be employed to present the pins to the pin head at the track.

Guide rolls 94 guide the rubber strip toward cut-off assembly 96. Upstream of guide rolls 94, an optional electric eye 98 or other sensor detects presence of pins in the respective holes in the rubber strip and signals such detects to PLC 100.

Computing capacity of the PLC, and of the processor in camera 34, in combination provide computation and memory resources which work together to receive and control input received through the camera as a sensor. Thus, where e.g. a computation or memory step is mentioned herein, such step can as well be performed in either the camera or the PLC, or the step can be a shared function of the camera and the PLC. The element of choice can depend in part on the percent utilization of computing capacities of the respective units as driven by other demands on memory and/or computing capacity.

Images recorded by camera 34 are typically recorded as pixel images in digital format. The combination of the image elements, including the intensity of the respective pixel signals, recorded at the respective pixels makes up the respective image. The image is sensed with respect to the pixels which make up the image. In the illustrated embodiment, camera 34 is fixed in position, and the position and direction of aim of the camera are registered to controller memory. Thus, given the calibrated position and direction of aim of the camera, and given the combination of pixels which make up the image collected by the camera, the camera and/or PLC 100 can determine the position of the hole imaged by the camera, or the pin imaged by the camera. So long as the image recorded by the camera contains the hole or pin being looked for, the camera and/or PLC 100 can determine the location of the hole or pin.

PLC 100 interrogates the respective digital images captured by camera 34, or the image detect results computed by the camera, regarding the sensing activities of respective pixels, whether recognized or not recognized, and accordingly makes automatic decisions regarding the ongoing manufacturing operation. The typical decisions regard proper formation of a hole and proper installation of a pin in a hole, and position of a hole to be subsequently formed.

Typically, each pixel has a rather wide range of signal intensity capabilities, for example 256 possible intensities. Accordingly, a given pixel can record no intensity of signal registration, a high level of intensity, or a wide variety of intensities between no signal and a high level of signal intensity. By combining the intensity levels recorded by the respective pixels in the array, and comparing the pattern of pixel intensities to a reference image database, the camera or PLC can search a given image for a recognizable pixel pattern. Upon recognizing a pixel pattern, the camera or PLC can assess whether the recognizable pattern meets threshold criteria for an acceptable image, such as a pattern of an acceptable hole, a pattern of an unacceptable hole, a pattern of an acceptable pin, a pattern of an unacceptable pin. Based on such assessment, the PLC can instruct the take away portion of machine 10, beyond cut-off assembly 96, to shunt a defective unit of seal product out of the product stream for further inspection or re-work.

Given the pixel-by-pixel sensitivity of camera 34, and normal processing capability of the camera processor and/or PLC 100, the camera or PLC can interrogate a given image and assess the quality of a hole 102, presence or absence of a pin 90 in the hole, and whether the pin is properly set in the hole. With respect to such assessment, the camera processor or the PLC is programmed to recognize only those pixels having a signal intensity above a specified minimum. The specified minimum thus serves as a first level electronic filter to filter out most noise signals. The threshold magnitude, of course, has a bearing on the ability of the processor to discriminate between noise and actual detect signals, whereby historical data is typically used as a basis for arriving at the most advantageous threshold detect level of pixel activity.

A suitable camera 34, effective for use in inspecting and assessing the presence and quality of holes in the seal strip material, and in assessing proper placement of mounting pins 90, assuming suitable routine programming of the camera, is available as the 530 Smart Image Sensor from DVT Corporation, Norcross, Ga. The 530 Smart Image Sensor has a 640×480 array of pixels for sensing the respective elements of an image, and feeding the image elements to the camera processor, and subsequently feeding resultant data to the PLC.

The visual image camera senses visual images of the rubber strip at specified times, so as to sense presence, location, and quality of already-formed ones of the holes, as well as to sense presence of a pin in a respective hole, and whether the pin is properly set in the hole.

Regarding each "image" sensed by camera 34, as the image is being recorded, the rubber strip is longitudinally and laterally stationary, the camera is stationary, and the camera takes a reading through what is commonly called an "image window", namely the length and width of the area in front of the camera which can be recorded by the pixels in the camera sensor area, through a given lens, whether an optical lens or an electronic lens, at a given distance between the camera and the target rubber strip. Given that the camera is in a given known location, and is pointed in a given known direction from a given distance, and is lensed to certain specifications, a known length and width of the work station is imaged in a given frame. The camera can as well be movable from a known location, which is then used as a base location, with movement from the base location being sensed by a sensor, e.g. an encoder, and fed back to PLC 100. PLC 100 then adjusts the camera position parameters in accord with the encoder input.

The camera processor, optionally drawing from PLC 100, is pre-programmed to look for a specific set of camera pixel signals, both on/off, and intensity of signal from each pixel sensor. By comparing the composite image relating to the hole or pin, and recorded in the image window, with a reference image, by allowing for suitable threshold differences between the reference image and the sensed images, and by accommodating the image being at any location in the image window, the camera processor can make a go/no go decision regarding quality of each hole formed, and quality of placement of each pin placed in a hole. Based on such quality judgement, and results thereof passed to the PLC, the PLC can, as to each respective work piece, direct that the given work piece be processed for shipping or removed from the stream of finished product for further inspection and decision.

By comparing a camera image of a hole against a reference image of a hole which has previously been placed in the memory of the camera processor or the PLC, the camera processor can determine whether a hole has been formed, and the location of the hole. In addition, by comparing the features of a hole in a camera window against the features of the reference image, the processor can detect the presence of a puck attached to the edge of the hole, or stuck in the hole, whereby the hole can be rejected for manual reworking.

Regarding the pins, by comparing a camera image of a pin in a hole, against a reference image of a pin in a hole, the processor can detect that no pin has been emplaced. In addition, the processors are sufficiently sensitive to detect when a pin has been emplaced but with only one leg 104 in the hole, and the opposite leg out of the hole. Such placement leaves the pin tilted from the vertical orientation of the reference, and reveals the exposed leg, whereby the combination of tilt and exposed leg provides an image sufficiently different from the reference image that the camera processor, or the PLC, can distinguish the anomalous image from the reference image and thereby record that the pin has not been properly placed in the hole, and reject the respective strip of seal material for further processing.

In order for camera 34 to be able to inspect for presence, positioning, and/or quality of a hole 102, or quality of insertion of a pin 90, the camera must be positioned and oriented in such location as to facilitate such inspection. Thus, the positioning and orientation of the camera must provide for a view angle, which generally intersects the surface of the seal material in which the hole is formed, close to or at the hole, of at least about 30 degrees. For inspecting presence and quality of pin emplacement, the camera positioning and orientation should provide for something other than an edge view of a leg 104. Again, the view angle should generally intersect the surface of the seal material in which the hole is formed, and the pin emplaced, close to or at the pin, at an angle of at least about 30 degrees.

A vertical projection of the position of the camera to a plane of the surface of the seal material being worked typically intersects the plane proximate the location of the hole or pin being inspected. Namely, the camera is distanced from the inspection target, hole or pin, far enough that the camera does not interfere with other operations of the machine, far enough to ensure that a full image of the target can be obtained, and close enough that the image obtained is large enough for computer/camera comparison purposes The projection can be laterally displaced to the side of the hole or pin, and can be upstream or downstream of the hole or pin, within the constraints of the above operating parameters.

Any angle of at least 30 degrees, up to 90 degrees, to the target seal surface, can be employed. The angle employed is selected in light of space available for positioning the camera can where the camera can have an unobstructed view, e.g. free from other machine elements, of the target locus on the seal material, e.g. where a hole is formed or a pin inserted. Typically, an angle of either 45 degrees, 60 degrees, or 90 degrees is preferred.

Whatever the positioning and angle of orientation of the camera, the selected position and orientation, or home position and home orientation, are programmed into PLC 100 such that the PLC knows, at all necessary times, the position and orientation of the camera. Any reference images, stored in either the camera or the PLC, are likewise selected or modified, as necessary, to accommodate the selected position and orientation of camera 34.

While a visual image camera has been described, other types of cameras can be used as well. Indeed, the invention contemplates a wide variety of cameras which can be employed to collect the image data required by the PLC. In general, any camera which can sense profiles and locations of the holes and pins, and which can send such location and profile information to the PLC, in sufficient form that the PLC can extract the information needed to assess the quality and location issues being addressed here, is satisfactory for use in the invention. For example and without limitation, and choosing to not be bound by theory, there can be mentioned, in addition to visual image cameras, cameras which sense infrared radiation and cameras which sense visual light stimulated by ultraviolet radiation. Other wave lengths, as well as other sensor array structures, and processing apparatus and programming, will be obvious to those skilled in the art.

A critical concept in some embodiments is to convey the location and quality characteristics of a hole already formed, to the PLC, to locate the position for the next hole, and to form the next hole, all without intervening movement of the rubber strip work piece. Further, it is critical to detect presence and proper placement of a pin 90. Similarly, the sensor array, of whatever label, such as camera 34, should be able to accept data as illustrated herein, relating to quality of the work performed, and transmit such information to the PLC. As indicated above, any processing capability attributed to the camera can be performed by the PLC processor so long as sufficient processing capability is provided in the PLC.

In a first and illustrative embodiment, the invention operates as follows. A strip of rubber seal material is fed intermittently through a feed drive assembly comprising feed belts 14A, 14B which are powered by feed section servo motor 20 with encoder, which comprises a closed loop drive system The drive system can be oriented vertically, or horizontally as illustrated, or at any angle between vertical and horizontal.

From feed belts 14A, 14B, the rubber strip is fed along work station 28 in line with the image window of the visual image camera, and stopped. The upper working surface of the work station can simply be a guide bed which is e.g. configured to replicate the lower surface of the profile of the rubber extrusion. In the alternative, and preferably, the guide bed can be mounted over an air box which feeds pressurized air up through the guide bed thereby creating a levitating effect which reduces effective friction between the rubber strip and the guide bed, thereby facilitating feeding of the rubber strip along the work station at guide bed 32.

The second belt drive assembly powering belts 30A, 30B may or may not be required, depending generally on the stiffness and friction properties of the rubber strip. The softer, or less stiff, the rubber strip, and the higher the coefficient of friction, the greater the likelihood that the second drive assembly is required, whereby the combination of the first and second drive assemblies provides a push/pull effect in feeding the rubber strip through machine 10.

When feeding a rubber strip initially into machine 10, the strip is first fed until the leading end of the strip has passed through feed belts 14A, 14B, across guide bed 32, through feed belts 30A, 30B, and through guide rollers 94, prior to forming any holes or inserting any pins. Once the initial feed has been completed, the forming and pinning head moves any distance necessary to achieve a location adjacent camera 34 in the pinning section of the work station such that, when a hole is formed, the hole is within the field of view of camera 34. Hold-down clamp 55, which extends along the length of the work station, clamps the rubber seal material strip down on the guide bed and holds the rubber strip immobile while work is being performed on the rubber strip. The drill then advances in a downward direction toward strip 12 and drills a first hole 102 close to the end of the rubber strip, but without interfering with drive belts 30A, 30B or camera 34. Thus, the drill head is in the pinning section of the work station when the first hole is made when a rubber strip 12 is newly-fed into machine 10.

Location of the forming and pinning head along horizontal slide bed 38 is controlled by the servo motor which drives L-shaped bracket 40 along slide bed 38, and is recorded by the encoder associated with that servo motor, and is reported to the PLC. As in any servo operation using an encoder, the function of the encoder is to count the increments of movement of servo motor 52, which serves as a proxy for the increments of horizontal movement of the hole forming and pinning assembly, either as abstract unit-less movements, or as increments identified with a unit of measure.

After drilling the first hole 102, the drill head backs away from the rubber strip sufficiently that camera 34 can detect and analyze the quality of the hole.

As indicated hereinabove, the visual image camera has an array of pixels with various shades of gray detectable at each pixel. The number of shades of gray varies depending on the specific camera being used. The camera feeds its detect results to the PLC, which results tell the PLC that a hole has been formed, tells the location of the hole, and tells the PLC various quality parameters such as whether the puck has been left in the hole. Given the location of the hole as defined through camera 34, and given the desired hole-to-hole spacing which has been programmed into the PCL, the PLC instructs the servo drive unit at horizontal slide table 38 with the distance for moving the hole forming and pinning assembly for forming the second hole.

Once the first hole 102 has been drilled in the pinning section, and the drill head has moved out of the way, the camera captures an image, with the hole desirably in the image, and the camera and/or PLC assesses the resultant image, with gray scale information. The processor interprets the "first hole location" information according to a database of stored acceptable reference hole signatures, thus detecting presence, quality, and location, of the hole, and the camera communicates raw data or any such processed information to the PLC. The PLC also receives information from horizontal slide bed 38, as well as optionally from e.g. a microswitch (not shown), or other reference location, so as to positively determine the location of the hole forming and pinning assembly along slide bed 38. The PLC then computes the desired location of the next/second hole to be drilled, and the direction and distance which the hole forming and pinning assembly should move in order to reach the desired location for the second hole.

At about the same time, the PLC issues a move command instructing horizontal slide bed 38 to move the hole forming and pinning assembly such that the pinning head picks up a pin from pin feeder track 88, then moves over the first hole and inserts the pin in the hole. This pin will be the pin which will be closest to the leading cut end of the strip when the leading end is subsequently cut. Camera 34 then inspects for proper insertion of the pin. The PLC then issues a move command instructing the horizontal slide bed 38 to move the hole forming and pinning assembly to the computed new drilling location. Thus, the first hole 102 is formed close to the end of the rubber strip, adjacent camera 34, and is subsequently used as an index reference for locating the position for forming the second hole.

With arrival of the hole forming and pinning assembly at the location where the second hole is to be formed, the drill is again extended toward the rubber strip and the second hole is formed. Thus, the second hole is formed without moving the rubber strip from the location occupied when the camera detected the location of the first hole. As a result of not moving the rubber strip from the time the position of the first hole is detected to the time the second hole is made, the location of the second hole is determined primarily by precision with which the PLC can drive the servo motor on slide bed 38, in combination with the precision of the respective encoder. In general, the average variance, between target hole-to-hole distance and average actual hole-to-hole distance, can be held to within 1 mm of the target hole-to-hole distance.

After the hole is made by the hole forming and pinning assembly, hold-down clamp 55, which clamps the rubber strip to the guide bed, is released and the rubber strip is advanced by the drive belts 14A, 14B and corresponding belts 30A, 30B, so that the second hole is within the image window, field of view, of the camera, whereupon the driving is stopped and the clamp is again engaged, holding the rubber strip immobile while further work is being performed on the rubber strip. Namely, the presence, location, and quality of the second hole are detected by the camera, and a second pin is inserted into the second hole. Presence and location of the second pin, and proper insertion of the second pin, are inspected by the camera. Location of the second hole is used as basis for forming the next/third hole before the strip is moved the third time. Additional holes are formed, pinned, and inspected, using the same process actions, until the specified number of holes have been formed, and pins placed and inspected.

Contrary to conventional practice, in the invention, the exact distance by which the rubber strip is advanced is not critical to successful operation of the process because the position of a given hole can be detected by camera 34 anywhere within the image window; and positioning of the next hole is based on the detected hole position, not on any feedback from the drive system. Thus, the mechanical tolerances of the drive system can actually be more relaxed, less precise, in the invention than when employing conventional drilling and pinning machines, requiring only that the requisite hole be advanced into the image window, while achieving improved dimensional accuracy in the finished parts.

What is critical is that, when advance of the rubber strip is stopped, the just-drilled hole (e.g. second hole) is within the field of view/image window of the camera. So long as substantially the entirety of the just-drilled hole is within the field of view of the camera, the camera can capture a sufficiently full image of the hole that the respective processor can successfully compare the camera image to the reference image in memory, whereby the process can work successfully to locate the imaged hole to the PLC, and to compute positioning of the drill head for forming the next hole at the desired location.

While the rubber strip is being advanced to bring second hole under the camera and into the camera image window, the hole forming and pinning assembly is simultaneously being moved to the same area, such that the hole forming and pinning assembly is generally positioned over the second hole, but backed away from the second hole far enough that preferably neither the drill head nor the pinning head is in the camera window, whereby the camera can see the second hole without being distracted by elements of the hole forming and pinning assembly.

The camera captures an image inclusive of the second hole, and processes the image and communicates the processed image information to the PLC. Either before or after the camera has taken its image, the hole forming and pinning assembly is moved such that pinning head 48 picks up a pin, whereupon, after the camera has captured the image, assembly 36 moves pinning head 48 over the second hole and advances the pinning head to the second hole, and servo drive unit 50 rocks the pinning head about the axis of shaft 54 thus to install the pin in the hole with back and forth rocking movements.

Concurrent with the hole forming and pinning assembly inserting the pin, the PLC interprets the camera image information, which provides the exact location of the second hole along the path of travel of the work piece, and within the detection tolerance of the camera (e.g. pixel density and known camera location). The more pixels per unit area of the camera window, and the more precisely the location of the camera is known, the more precision can be applied to the detect process of determining the exact location of the second hole. The image processing further ensures that the hole has been formed, and that the puck has been removed.

Given the location of the second hole, the PLC computes the location along the length of the work station where the drill head assembly should be positioned for drilling the third hole in the once again stationary rubber strip, and instructs the drive which drives the hole forming and pinning assembly on slide bed 38 to move the hole forming and pinning assembly to the computed location.

The slide bed drive then drives the hole forming and pinning assembly to the instructed location as measured by the encoder in the respective servo drive assembly. The hole forming head then advances downwardly toward the rubber strip and forms the third hole at the location specified by the PLC, and then withdraws upwardly.

Meantime, the PLC instructs servo drive unit 20 regarding the distance the drive belts 14A, 14B should drive the raw material rubber strip during the next incremental feeding drive of work piece material into the work station. The hole forming and pinning assembly then advances to a position adjacent the camera while the rubber strip is unclamped and concurrently advanced the instructed distance, sufficient to bring the third hole within the image window of the camera.

The camera captures an image of the third hole. The image/detect information is fed to the camera processor, and the processed information is fed to the PLC, which then computes the drive commands to drive the hole forming and pinning assembly to the correct location for drilling the fourth hole as well as the drive distance for belts 14A, 14B, and 30A, 30B. For example, if the commanded drive distance was 100 mm and the rubber strip only moved 98 mm, a drive compensation of plus 2 mm is computed and communicated to the servos driving belts 14A, 14B, 30A, 30B for the distance to be driven in the next incremental driving of strip 12.

Meantime, the pinning head of the hole forming and pinning assembly picks up a pin from track 88 and inserts the pin into the third hole before the hole forming and pinning assembly is moved to the location for drilling the fourth hole.

The steps of forming holes at hole forming station 86, inserting pins at pinning section 84, and inspecting holes and pins at camera 34, are repeated until the proper number of holes are formed and pins inserted. Further, as the proper length of strip material is periodically fed, corresponding finished parts are periodically separated from the strip at cut-off assembly 96, thus to produce a stream of finished parts.

An important feature of the relationship between the visual image camera and the PLC is that specific reference image profiles can be stored in the camera memory or the PLC, sufficient to determine that the plug from drilling a hole has in fact been removed from the hole, that the pin has in fact been properly placed in the hole. Such quality information, or raw or partially processed such data, is periodically communicated to the PLC. For example, if the plug has not been fully removed from the hole, if the plug is partially removed from the hole, if the plug is hanging at the hole (e.g. a "chad"), the camera can detect such defect of the hole. If the pin is not in the hole, if the pin is partially in the hole, if the pin is misplaced in the hole, the camera can detect such defect in placement of the pin. In either defect case, the PLC can thus instruct ejection of the respective work piece for manual inspection and correction. A resulting advantage is that the reject rate regarding plugs in holes, and misplaced or missing pins, in shipped product is substantially reduced.

In view of the above structure and process, one can extend the length of the work station and drill multiple holes without moving the rubber strip. In such embodiment, camera 34 is mounted on bracket 40 along with the hole forming and pinning assembly. Preferably, a pin magazine is added to pinning head 48, sufficient to hold enough pins to pin all holes to be formed for a given discrete-length cut-off door seal product, also referred to herein as a "work piece". After the first hole is formed and located, PLC 100 can then determine encoder commands for all other holes to be formed in the discrete-length cut-off product. PLC 100 then instructs movement of the hole forming and pinning assembly, and camera, along the slide bed 38, stopping at each hole-to-be-formed location and forming a corresponding hole. After all the holes have been formed, the hole forming and pinning assembly moves back toward the first hole, stopping to insert a pin in each hole along the way, and inspecting each of the pinned holes as desired. Thus, at each such location, a hole is formed and pinned, and inspected as desired.

Once the full length of the work product has been drilled and pinned, the rubber strip is indexed a full length of the work product, and the process repeated for the next product length. The basis for the location of the first hole in the next product length can be the stored location of one of the holes in a previously-processed work piece, preferably the most recently processed work piece.

in some embodiments, discrete lengths of seal material, already cut to finished product length, are fed to the machine of the invention, whereby a known location of an end of the work piece can be the basis for location of one or more of the holes in the work piece.

While the above description has discussed hole formation as a drilling operation, other methods can be employed to form such holes, and all conventional such methods are contemplated to be within the scope of the invention.

The disclosure herein has focused on forming holes in rubber strip material. It will be understood, that the apparatus and methods disclosed here apply equally well to a wide variety of flexible materials, especially soft and/or flexible polymers which may or may not be classified as rubbers. Thus, various of the well known plastic materials, such as various of the silicone rubbers, the olefins, acrylics, vinyl acetates, and like flexible materials are quite suitable as work piece materials for processes employing the invention.

While the illustrated embodiments have shown drill head assembly 64 and pinning head 48 mounted on a common support, namely L-shaped bracket 40, and moving along a common slide bed 38, the invention does contemplate embodiments wherein drill head assembly 64 and pinning head 48 are separately mounted, supported, and directed by PLC 100. Thus, drill head assembly 64 can be mounted on a first support on a first slide bed, and driven along the first slide bed by a first drive mechanism; while pinning head 48 can be mounted on a separate and distinct second fixed, or preferably horizontally movable support on the first slide bed, or on a separate and distinct second slide bed, and driven along the respective slide bed by a second drive mechanism.

Whether the drill head assembly is mounted separate from pinning head 48, or mounted on a common support with the pinning head, it is desirable that the drill head assembly be able to move to a location closely adjacent camera 34 for making the first hole in a strip of rubber material. By the time the first hole is to be made in the strip of rubber material, the leading end of the rubber strip has been fed at least through the guide rolls 94. By so arranging for forming the first hole as close as possible to feed belts 30A, 30B, the user can make the first hole in a strip as close as possible to the leading end of the strip, thus potentially limiting the amount of scrap at the leading end of the strip by limiting the length of the material which is between the first hole and the leading end.

By detecting the location of a previously-formed hole, and using the detected location as input for determining the distance by which the drill head assembly should move to form the next hole, and by moving the drill head assembly 64 along the length of the rubber strip that determined distance while the strip is held stationary by clamp 55, the methods of the invention achieve an improved precision in forming the subsequent hole at a desired hole-to-hole distance, or at a desired hole-to-cut off end distance.

Referencing the next hole to be formed from a previously-formed hole using an image array camera to accurately determine a desired drive compensation contributes substantially to the precision with which the invention produces desired hole-to-hole distances and hole-to-cut off distances. One can, of course, reference a hole further away than the noted last or adjacent hole, and achieve the objectives of the invention. Indeed, such more remote reference hole and/or pin is utilized in those embodiments where more than one hole is formed and pinned without moving the work piece.

By feeding the compensation information both to the drive of slide bed 38 and to the drives of the feed belts, both belts 14A, 14B, and belts 30A, 30B, both drives participate in making the invention efficient in directing the hole locations toward target values. Feeding compensation information to the drive at horizontal slide bed 38 enhances accuracy of positioning of the drill head assembly for forming the next hole. Feeding compensation information to the feed belts enables the feeding step to reliably position the formed hole in the field of view of the camera, and hopefully the hole is generally centered in that field of view. Thus, both compensation increments, fed to slide bed 38, and to feed belts 14A, 14B and 30A, 30B, participate in enhancing the accuracy and efficiency of positioning of drilled holes in the field of view of camera 34, and accuracy and efficiency of forming the next hole.

Using the camera to assess proper formation of the hole, and removal of the puck; and to assess proper insertion of the pin, and to initiate rejection of parts considered defective according to such automatic assessment, reduces the number of defective parts which are automatically deployed for shipment to customers, and accordingly enables the fabricator to focus a higher level of the operator's time on produced parts which are in fact defective.

However, not all holes need be inspected. In instances where a puck may remain attached to the hole, the act of inserting the pin typically removes the puck, whereby inspection of only the inserted pin for quality, and not the hole, or inspecting fewer than all holes, is contemplated.

Where an air table type of air flow is used to blow air up through guide bed 32, thus to tend to levitate the rubber strip from the guide bed, or to otherwise reduce the effective friction between the guide bed and the rubber strip, the rubber strip is enabled to move with decreased longitudinal force being applied to the rubber strip, whereby the strip moves with less of the physical stress which can cause compression or stretching of the rubber strip—both being factors in the effective dimensional instability of the rubber strip, and the corresponding variance of spacings of the holes from desired spacings. In addition, use of the air assist, in some embodiments, can obviate need for the second set of feed belts 30A, 30B.

As used herein, "path of travel" refers to a course followed by an elongate generally continuous flexible door seal material from the time the door seal material enters machine 10 at feed belts 14A, 14B to the time the door seal material exits machine 10 as a finished part after being cut off at cut-off assembly 96. Such path of travel in the illustrated embodiments generally progresses from feed belts 14A, 14B in a straight line toward feed belts 30A, 30B, along horizontal slide bed 38, and under camera 34, thence to guide rolls 94 and cut-off assembly 96.

In another family of alternative embodiments, machine 10 is designed and configured to receive and process strip material 12 as discrete lengths, not generally continuous lengths, of raw material. Strip material 12 can, for example, be supplied in a pre-determined desired length for the finished work piece, whereby machine 10 does not cut the strip material for length.

In such case, machine 10 need not perform the functions of driving a continuous strip into and along guide bed 32, and optionally not cutting the strip for length. Accordingly, drive belts 14A, 14B, and drive 20 and belt 22, can be eliminated. Where the strip is not cut for length, drive belts 30A, 30B, guide rolls 94, cut-off assembly 96, and electric eye 98, can be eliminated. Leading and trailing end stops are mounted on guide bed 32 for guiding proper longitudinal positioning of a discrete length of seal material on the guide bed. Suitable controls are provided on hold-down clamp 55 to enable an operator to operate clamp 55 as desired. Camera 34 is mounted on L-shaped bracket 40 so as to move with the drill head and the pinning head. The encoder attached to the drive driving the L-shaped bracket along slide bed 38 thus also serves to provide location information regarding camera 34, with reference to a home location, or other known location, to PLC 100. In some embodiments, guide bed 32 is mounted on a slide table which can move guide bed 32 toward the operator, namely away from slide bed 38, e.g. to facilitate operator loading and unloading of the rubber strips into and out of the guide bed.

With a rubber strip loaded, and properly positioned on, the guide bed, clamped by clamp 55, and the guide bed aligned with hole forming and pinning assembly 36, the hole forming and pinning assembly, along with camera 34, moves to the specified location of the first hole to be drilled, the drill location on the rubber strip being within the view window of camera 34. The drill head then drills the first hole. Camera 34 inspects the position and quality of the first drilled hole and sends the location and quality information to PLC 100. The pinning head picks up a pin from pin feeder track 88 and inserts the pin in the drilled hole. After the pin is inserted, the camera inspects the pin for proper installation in the hole. The PLC then instructs movement of the hole forming and pinning assembly 36, and camera 34, to subsequent locations for drilling additional holes along the rubber strip, as well as for inspecting the drilled holes, inserting pins into the holes, and inspecting the pins after insertion.

Once all desired holes have been drilled, pinned, and inspected, guide bed 32 can move toward the operator, clamp 55 is released from the rubber strip and the rubber strip is removed by the operator. A subsequent strip work piece is placed on guide bed 32 by the operator, clamped into place, and the process repeated.

In a modification of the above embodiment, the leading end stop is eliminated, the drive system represented by drive belts 30A, 30B is retained, and drives the rubber strip to an exit of the machine beyond belts 30A, 30B after all holes have been formed, pinned, and inspected. In such embodiment, the camera can be mounted on bracket 40 as described, or can be fixedly mounted to a support separate from bracket 40. Where the camera is mounted on bracket 40, the inspection process is carried out as described above for the camera being mounted on the bracket. Where the camera is separately and fixedly mounted, the strip, with the holes but not the pins, can stop as each hole arrives within the camera window, whereupon the camera inspects the hole, a pin is inserted, and the pin is inspected. In the alternative, and as a less preferred process, the pins are inserted in the holes before the holes arrive at the camera, and the camera makes a single inspection designed to detect defects in either the hole or the pin, or both.

In yet another family of embodiments, movement of the drill head and pinning head are limited to the area of camera 34, and guide bed 32 is mounted on a slide bed so as to enable the guide bed to move in a direction along the length of the rubber strip. With the rubber strip firmly clamped to the guide bed by clamp 55, the guide bed presents the seal material under the drill head, at the location for drilling the first hole. The drill head drills the hole and withdraws. The camera inspects the first hole for location and defects and reports to the PLC. The pinning head approaches the first hole with a pin, and installs the pin in the first hole. Camera 34 then inspects installation of the pin. The PLC then instructs movement of the guide bed and clamped rubber strip, along the length of the rubber strip until the second hole location is within the image window of the camera, and is properly positioned under the drill head for forming the second hole. The second hole is formed, inspected, a pin inserted, and the pin insertion inspected, all as above. Third, fourth, and so on, holes are formed, inspected, pinned, and the pinning inspected as above, to form and pin the desired number of holes. For each hole, the guide bed and clamped rubber strip are advanced together while the rubber strip remains clamped to the guide bed. A suitable encoder or other distance-sensing device is connected to guide bed 32 in order to communicate guide bed location to the PLC.

In a modification of the above embodiment, the combination of (i) hole forming and pinning assembly 36 and camera 34, and (ii) guide bed 32 and rubber strip 12, both move along the direction of extension of the length of the rubber strip to bring the hole forming and pinning assembly, and camera 34, to the next desired location along the length of the rubber strip. By moving guide bed 32, and assembly 36 and camera 34, which are thus all operating as movable fixtures, the time between succeeding forming and pinning steps can be shortened. In addition, by moving both elements of the machine, the overall requirement for floor space is reduced compared to the embodiments where the guide bed moves and the hole forming and pinning assembly substantially stationary.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

To the extent reference numerals are used in the following claims, such reference numerals are for illustration purposes only and shall not limit the scope of the claims to the embodiments illustrated by such reference numerals.

Having thus described the invention, what is claimed is:

1. A flexible seal processing machine, for processing an elongate strip of flexible seal material, having a length, said flexible seal processing machine comprising:
   (a) a feed apparatus for feeding lengths of such flexible seal material along a path of travel to a work station;
   (b) a hole forming apparatus adapted to be movably positioned at a hole forming section of the work station, for forming holes, in which pins can be mounted, in such flexible seal material; and
   (c) a hole pinning apparatus adapted to be movably positioned at a pinning section of the work station, such pinning section remote from the hole forming section and, displaced from such hole forming section by a distance approximating a desired hole-to-hole distance between sequential holes in such flexible seal material, for inserting pins in the holes which are formed at the hole forming section.

2. A flexible seal processing machine as in claim 1, further comprising an electronic computer controller controlling operation of said flexible seal processing machine.

3. A flexible seal processing machine as in claim 2, further comprising a sensor sensing holes in such flexible seal material, and sending such sensed information to said electronic computer controller.

4. A flexible seal processing machine as in claim 3, said hole forming apparatus and said hole pinning apparatus being mounted on a common support thereby to define a hole forming and pinning apparatus, said sensor also being mounted on the common support, such that said hole forming apparatus, said hole pinning apparatus, and said sensor traverse said work station together.

5. A flexible seal processing machine as in claim 2, further comprising a sensor sensing holes in such flexible seal material, and sending such sensed information to said electronic computer controller, said work station comprising a guide bed receiving such flexible seal material thereon at said work station, said hole forming apparatus and said hole pinning apparatus being mounted on a common support thereby to define a hole forming and pinning apparatus, said feed apparatus intermittently feeding incremental lengths of such flexible seal material to said guide bed, said electronic computer controller receiving sensed information regarding location of holes already formed, and being effective to control incremental feed drive movement required to feed desired lengths of such flexible seal material fed to said work station, and distance of movement of said hole forming and pinning apparatus to a hole forming location, both based on the sensed information received from said sensor, such that average hole-to-hole distance is within 1.5 mm of respective target distances.

6. A flexible seal processing machine as in claim 1, said work station comprising a guide bed, said machine further comprising translation structure translating at least one of said guide bed and, in combination, said hole forming apparatus and said hole pinning apparatus, along the length of such elongate strip of flexible seal material, at said work station.

7. A flexible seal processing machine as in claim 1 wherein said work station comprises a guide bed, said hole forming apparatus and said hole pinning apparatus being mounted on a common support member, the combination of said hole forming apparatus, said hole pinning apparatus, and said common support member defining a hole forming and pinning apparatus, such flexible seal processing machine further comprising a translation structure comprising a track which movably mounts said hole forming and pinning apparatus in said machine adjacent said guide bed, for movement of said hole forming and pinning apparatus along a path of travel extending in a direction corresponding to the length of such flexible seal material at said guide bed.

8. A flexible seal processing machine as in claim 7, further comprising an electronic computer controller adapted and configured to control the operation of said flexible seal processing machine, said electronic computer controller being programmed with instructions instructing movement of said hole forming and pinning apparatus back and forth along said track between a hole forming section of said work station and a pinning section of said work station.

9. A flexible seal processing machine as in claim 7, including a detector adapted and configured to detect the location of said hole forming and pinning apparatus along said guide bed, and adapted and configured to send such detected information to said electronic computer controller, said electronic computer controller having programming which comprises data representing a desired sequence of distances between holes in such flexible seal material, and an algorithm effective to calculate a distance of movement of said forming and pinning apparatus along said guide bed, based on such detected information, for subsequently forming a hole in such flexible seal material.

10. A flexible seal processing machine, for processing an elongate strip of flexible seal material, having a length, said flexible seal processing machine comprising:
(a) a feed apparatus for feeding lengths of such flexible seal material into said machine;
(b) a work station comprising a guide bed receiving such flexible seal material and guiding such flexible seal material along a path of travel between a feed end of said work station and an exit end of said work station;
(c) an air chamber positioned below said guide bed and adapted to expel air upwardly through holes extending between the air chamber and said guide bed to facilitate movement of such flexible seal material along the path of travel, on the guide bed; and
(d) a hole forming and pinning apparatus adjacent said work station, adapted to form holes in such flexible seal material, and to insert pins into holes so formed.

11. A flexible seal processing machine as in claim 10, further comprising translation structure translating at least one of said guide bed and said hole forming and pinning apparatus along the length of such elongate strip of flexible seal material.

12. A flexible seal processing machine as in claim 10, further comprising an electronic computer controller controlling operations of said flexible seal processing machine, and translation structure comprising a track mounting said hole forming and pinning apparatus to in said machine adjacent said guide bed, for movement of said hole forming and pinning apparatus along a path of travel extending in a direction corresponding to the length of such flexible seal material at said guide bed.

13. A flexible seal processing machine as in claim 10, further comprising an electronic computer controller controlling operations of said flexible seal processing machine, said hole forming and pinning apparatus being mounted for back and forth movement along said guide bed, said feed apparatus intermittently feeding incremental lengths of such flexible seal material to said guide bed, said electronic computer controller receiving sensed information from a sensor, regarding locations of holes already formed, and being effective to control incremental feed drive movement required to feed desired lengths of such flexible seal material fed to said work station, and to control distance of movement of said hole forming and pinning apparatus to a hole forming location, both based on the sensed information received from said sensor, such that average hole-to-hole distance is within 1.5 mm of respective target distances.

14. A flexible seal processing machine as in claim 10, further comprising a sensor sensing positions and condition of holes formed in the flexible seal material, said sensor being mounted on a common support with said hole forming and pinning apparatus, such that said hole forming and pinning apparatus, and said camera, traverse said work station together.

15. A method of processing flexible seal material, having a length, in a flexible seal processing machine, the method comprising:
(a) fixing a length of a strip of flexible seal material on a work station;
(b) making a first hole in the flexible seal material using a hole forming apparatus; and
(c) while maintaining the flexible seal material in a longitudinally fixed condition on the work station, sensing the location of the first hole in the flexible seal material, and, based on the sensed location of the first hole in the flexible seal material, moving the hole forming apparatus along the length of the flexible seal material to a location, displaced from the first hole by a predetermined target distance, and forming the second hole.

16. A method as in claim 15, including forming the first hole at a first location along a length of the flexible seal processing machine, and forming the second hole at a second location along the length of the flexible seal processing machine, the second location being displaced from the first location by approximately the distance between the first and second holes.

17. A method as in claim 15, including forming a plurality of holes in the flexible seal material, displaced from each other along the length of the flexible seal material, and inserting pins in the respective holes, including forming the holes at a first location along a path of travel of the flexible seal material and inserting the pins at a second location along the path of travel of the flexible seal material, the second location being displaced from the first location.

18. A method as in claim 17, including using a sensor to sense positions of the respective holes, and using the sensed position information to position the hole forming apparatus for forming holes trailing the respective sensed holes.

19. A method as in claim 15, including using a sensor to sense longitudinal position of each hole, in sequence, and using the sensed longitudinal position information to longitudinally position the hole forming apparatus for forming the next trailing hole in the flexible seal material.

20. A method as in claim 19, including forming a plurality of holes spaced along the length of the strip of flexible seal material, including using a hole forming and pinning apparatus to form the holes, and to insert pins into the holes, including forming the holes generally at a first location along the work station, and inserting the pins into the holes generally at a second separate and distinct portion of the work station.

21. A method as in claim 20, including using, as the sensor, a camera, the camera being fixed in position at or adjacent the second location to sense location of the holes formed in the seal material, sending the sensed information to a computer controller, the method further comprising using the computer controller to instruct drive apparatus driving the hole forming and pinning apparatus to thereby position the hole forming and pinning apparatus for forming the next hole.

22. A method as in claim 21 including, for each hole and pin combination, forming the hole, indexing the flexible seal material forward until the formed hole is within an image window of the camera while also moving the hole forming and pinning apparatus along the work station to a position adjacent the camera, and subsequently, while maintaining the flexible seal material in the longitudinally-fixed location, using the camera to sense the position of the hole, sending the hole position information to the computer controller, using the computer controller to compute a distance to move the hole forming and pinning apparatus to a forming location for forming a subsequent hole, using the hole forming and pinning apparatus alongside the camera to insert a pin in the formed hole, and subsequently moving the hole forming and pinning apparatus the computed distance to the hole forming location and forming a subsequent hole in the flexible seal material.

23. A method as in claim 15, including forming a plurality of holes spaced along the length of the flexible seal material, including using a hole forming and pinning apparatus to form the holes, and to insert pins into the holes, including forming the holes generally at a first location along the work station, and inserting the pins into the holes generally at a second separate and distinct portion of the work station.

24. A method as in claim 23, including moving the hole forming and pinning apparatus back and forth between the first and second locations along the work station, and alternating forming holes and inserting pins at the respective first and second locations.

25. A method as in claim 15 wherein adjacent ones of a population of such holes are displaced from each other by an average variance of no more than about 1.5 mm from target distances.

26. A method as in claim 15, including loading into the machine a discrete length flexible seal material, and holding the seal material in a single fixed location while forming all holes, and pinning all holes, in the discrete length seal material.

27. A method of fabricating flexible seals from a strip of flexible seal material, having a length, in a flexible seal processing machine, the method comprising:
   (a) placing lengths of the flexible seal material at a work station;
   (b) forming holes for mounting pins at a hole forming section of the work station; and
   (c) inserting pins in the formed holes at a pinning section of the work station displaced and distinct from the hole forming section of the work station;
wherein the pinning section is displaced from the hole forming section by a distance approximating a distance between sequential holes in the seal strip.

28. A method of fabricating flexible seals from a strip of flexible seal material, having a length, in a flexible seal processing machine, the method comprising:
   (a) placing lengths of the flexible seal material at a work station;
   (b) forming holes for mounting pins at a hole forming section of the work station;
   (c) inserting pins in the formed holes at a pinning section of the work station displaced and distinct from the hole forming section of the work station; and
   (d) employing a sensor to inspect each hole formed, and each pin inserted, while the strip of flexible seal material is at the work station.

29. A method of fabricating flexible seals from a strip of flexible seal material, having a length, in a flexible seal processing machine, the method comprising:
   (a) placing lengths of the flexible seal material at a work station;
   (b) forming holes for mounting pins at a hole forming section of the work station; and (c) inserting pins in the formed holes at a pinning section of the work station displaced and distinct from the hole forming section of the work station;
   (d) employing a sensor to inspect each hole formed, and each pin inserted, while the strip of flexible seal material is at the work station; and
   (e) feeding the results of the sensor inspections to a computer controller, and employing the computer controller to make automatic accept/reject decisions based on the recited inspections by the sensor.

30. A method of fabricating flexible seals from a strip of flexible seal material, having a length, in a flexible seal processing machine, the method comprising:
   (a) placing lengths of the flexible seal material at a work station;
   (b) forming holes for mounting pins at a hole forming section of the work station; and (c) inserting pins in the formed holes at a pinning section of the work station displaced and distinct from the hole forming section of the work station;
   (d) employing a sensor to inspect each hole formed, and each pin inserted, while the strip of flexible seal material is at the work station;
   (e) feeding the results of the sensor inspections to a computer controller, and employing the computer controller to make automatic accept/reject decisions based on the recited inspections by the sensor; and (f) providing the computer controller with reference images, and threshold criteria for making accept/reject decisions based on the reference images, and using the reference images and threshold criteria to automatically make accept/reject decisions for each work piece of flexible seal material processed.

31. A method of processing flexible seal material, in a flexible seal processing machine, the method comprising:

(a) feeding lengths of flexible seal material into the machine;

(b) receiving the flexible seal material at a work station comprising a guide bed, and guiding the flexible seal material along a path of travel between a feed end of the work station and an exit end of the work station, and expelling air upwardly through the guide bed and thereby facilitating movement of the flexible seal material along the path of travel, on the guide bed; and (c) using a forming and pinning apparatus adjacent the work station, forming holes in the flexible seal material, and inserting pins in the holes so formed.

32. A method as in claim 31, further comprising translating the forming and pinning apparatus along the work station, forming holes in the seal material at a first portion of the work station and inserting pins in the seal material at a second portion of the work station, displaced from the first portion of the work station, by a distance approximating a target distance between respective ones of the holes.

33. A method as in claim 31, further comprising sensing location and condition of each hole before inserting a pin, and sensing quality of insertion of each pin before releasing a given work piece from the work station.

34. A flexible seal processing machine, for processing an elongate strip of flexible seal material, having a length, said flexible seal processing machine comprising:

(a) a work station, comprising a guide bed having a first elongate dimension for receiving and holding thereon an elongate strip of flexible seal material having a length aligned with the first elongate dimension;

(b) a clamp apparatus for clamping the elongate strip of flexible seal material to said guide bed;

(c) an electronic computer controller controlling operation of said flexible seal processing machine;

(d) a hole forming apparatus and a hole pinning apparatus disposed along said guide bed for forming holes in such strip of flexible seal material, and for inserting pins into such holes; and (e) a camera positioned in combination with the work station so as to capture an image of a hole formed in such flexible seal material, or a pin inserted into such flexible seal material, from an angle of at least 30 degrees with respect to a surface of such seal material in which such hole is formed and/or such pin is inserted.

35. A flexible seal processing machine as in claim 34, said camera comprising a visual image camera.

36. A flexible seal processing machine as in claim 34, further comprising translation structure translating at least one of said guide bed and, in combination, said hole forming apparatus and said hole pinning apparatus along the length of such elongate strip of flexible seal material at said guide bed.

37. A flexible seal processing machine as in claim 36, said hole forming apparatus and said hole pinning apparatus being mounted on a common support thereby to define a hole forming and pinning apparatus, said translation structure comprising a track mounting said hole forming and pinning apparatus to said frame adjacent said guide bed, for movement of said hole forming and pinning apparatus along a path of travel extending in a direction corresponding to the length of such flexible seal material at said guide bed.

38. A flexible seal processing machine as in claim 37, said camera being mounted on the common support such that said hole forming apparatus, said hole pinning apparatus, and said camera traverse said work station together.

39. A flexible seal processing machine as in claim 37, said machine further comprising a detector detecting location of said hole forming and pinning apparatus along said guide bed, and sending such detect information to said electronic computer controller, programming in said electronic computer controller comprising data representing a desired sequence of distances between holes in such flexible seal material, and an algorithm effective to calculate a distance of movement of said forming and pinning apparatus along said guide bed, based on the information received from said detector, for subsequently forming a hole in such flexible seal material.

40. A flexible seal processing machine, for processing an elongate strip of flexible seal material, having a length, said flexible seal processing machine comprising:

(a) a feed apparatus for feeding lengths of such flexible seal material along a path of travel to a work station;

(b) a hole forming apparatus adapted to remove material from such flexible seal material thereby to create a hole having an open cross-section area which is devoid of such flexible seal material; and (c) a hole pinning apparatus adapted to be positioned at a pinning section of the work station, displaced from the hole forming section by a distance approximating a desired hole-to-hole distance between sequential holes in such flexible seal material, adapted to insert pins in holes which are formed at the hole forming section.

* * * * *

UNITED STATES PATENT AND TRADEMARK OFFICE
CERTIFICATE OF CORRECTION

PATENT NO.         : 7,111,374 B2                                         Page 1 of 1
APPLICATION NO.    : 10/404697
DATED              : September 26, 2006
INVENTOR(S)        : John Howard Stewart It is certified that error appears in the above-identified patent and that said Letters Patent is hereby corrected as shown below:

In Column 20, Line 59, Replace "in" with "In"
    [i.e., it should read "In some embodiments…"]

In Claim 1, Column 24, Line 49, First word, Delete comma after "and".
    [i.e., it should read "…and displaced from …."]

In Claim 12, Column 26, Line 20, Delete the word "to" from the phrase "apparatus to and in said machine"
    [i.e., it should read "…apparatus in said machine…"]

In Claim 29, Column 28, Line 42, move the letter "(c)" so it starts the next line, and remove the word "and" plus add a semicolon.
[i.e., it should read
    "…section of the work station;
    (c) inserting pins in the formed holes…." ]

In Claim 30, Column 28, Line 59, move the letter "(c)" so it starts the next line, and remove the word "and" plus add a semicolon.
[i.e., it should read
    "…section of the work station;
    (c) inserting pins in the formed holes…." ]

Signed and Sealed this

Nineteenth Day of December, 2006

JON W. DUDAS
*Director of the United States Patent and Trademark Office*